United States Patent [19]

Nakata et al.

[11] Patent Number: 4,721,031
[45] Date of Patent: Jan. 26, 1988

[54] TRACTOR CABIN

[75] Inventors: Masaru Nakata, Sakai; Kenichi Sato, Osaka; Isama Kawai; Katsumi Ohishi, both of Sakai; Mitsuhiko Obe, Izumiotsu; Takao Nishikawa, Sakai; Yoshaburo Shimizu, Kawachinagano; Kenji Hinoue, Sakai, all of Japan

[73] Assignee: Kubota, Ltd., Osaka, Japan

[21] Appl. No.: 863,219

[22] Filed: May 14, 1986

[30] Foreign Application Priority Data

Jun. 12, 1985 [JP] Japan .............................. 60-89372[U]

[51] Int. Cl.4 ............................................... B60H 1/00
[52] U.S. Cl. ....................................... 98/2.09; 98/2.11; 98/2.15; 296/190; 296/210
[58] Field of Search .................... 296/190, 208, 210; 98/2.09, 2.08, 2.11, 2.15

[56] References Cited

U.S. PATENT DOCUMENTS 3,555,846  1/1971  Harbeck et al. ................ 98/2.11
3,868,896  3/1975  Doll et al. ...................... 98/2.15
4,097,085  6/1978  Nelson ........................... 296/190
4,608,834  9/1986  Rummel ......................... 98/2.11

Primary Examiner—David A. Scherbel
Assistant Examiner—Carol L. Olson
Attorney, Agent, or Firm—Edwin E. Greigg

[57] ABSTRACT

A tractor cabin having struts, a top framework, an air conditioner mounted on the top framework, and a ceiling assembly covering an entire ceiling area of the cabin. In order to optimize air conditioned flows, the ceiling assembly includes outlet vents in a front region thereof for delivering defrosting air flows, outlet vents in lateral sides thereof for delivering air flows for the driver, an inside air intake vent in a rear portion thereof inside the cabin, and an outside air intake vent rearwardly and outwardly of the cabin. The ceiling assembly further includes an overhead console box having an air conditioning control unit and other elements. The console box is disposed such that its lower end is on or above a straight line extending from the driver's eye level to the top edge of a windshield to provide the driver with an unobstructed forward view.

5 Claims, 6 Drawing Figures

TRACTOR CABIN

BACKGROUND OF THE INVENTION

The present invention relates to a tractor cabin and more particularly to an upper structure of the tractor cabin.

It has been desired in recent years to provide the driver with a more comfortable environment inside the tractor cabin. As a first step to this end an air conditioner has been introduced. The air conditioner usually is mounted in a ceiling area of the cabin for effective use of the space. For conventional tractor cabins, however, enough consideration has not been made with respect to the arrangement of outlet and inlet vents of the air conditioner, air conditioned flows inside the cabin or to the obstruction to the driver's field of view by an enlarged ceiling area resulting from the installation of the air conditioner. In other words, it has heretofore been a basic concept to simply mount the air conditioner in the ceiling area of the tractor cabin and supply air conditioned flows into the cabin interior. The prior art practice has been totallly destitute of an approach from the point of view of human engineering.

SUMMARY OF THE INVENTION

An object of the present invention is to provide a tractor cabin employing a human engineering approach, realizing optimal air conditioned flows for the driver, and having an well-adapted ceiling.

The tractor cabin according to this invention includes an air conditioner mounted in a ceiling area and having outlet vents in a front portion and lateral portions and an intake vent in a rear portion of the cabin interior. This arrangement of the vents produces downward flows of air supply in the front and lateral portions of the cabin interior and upward flows of air withdrawal in the rear portion of the cabin. The driver is now free from the discomfort of air conditioned flows directly hitting certain parts of his body.

According to a further aspect of the invention, the ceiling of the cabin includes an overhead console box having a bottom end thereof located on or above a straight line extending from the eyes of a seated driver to a lower edge of an upper front portion of a windscreen mounting element. This construction assures a sufficient accommodating capacity of the overhead console without reducing the driver's field of view.

In a preferred embodiment of the invention, the tractor cabin includes front outlet vents adapted to direct air flows threfrom against the windshield, side outlet vents adapted to direct air flows therefrom toward the driver, and an air conditioner adapted to supply hot air into a first duct in communication with the front outlet vents and to supply a mixture of hot air and cold air into second ducts in communication with the side outlet vents. According to this embodiment, the air flows delivered from the front outlet vents have a defrosting function with respect to the windshield and the air flows delivered from the side outlet vents provide comfort for the driver.

In another preferred embodiment of the invention, a tractor cabin includes an elastic support member for supporting a top covering of the cabin from below. This support member is mounted between a top framework carrying the air conditioner and the top covering, and is secured to a cross member attached to the top framework so as to straddle the air conditioner. The top covering is formed to define a sufficient space between the top covering and the top framework to accommodate the air conditioner and other elements, and the above construction is effective to avoid the inconvenience of the top covering undergoing a plastic deformation with a central portion thereof caving in under some load such as snow.

Other features and advantages of the present invention will be apparent from the following description to be had with reference to the drawings and from the appended claims.

DESCRIPTION OF THE PREFERRED EMBODIMENT

Figure 1:
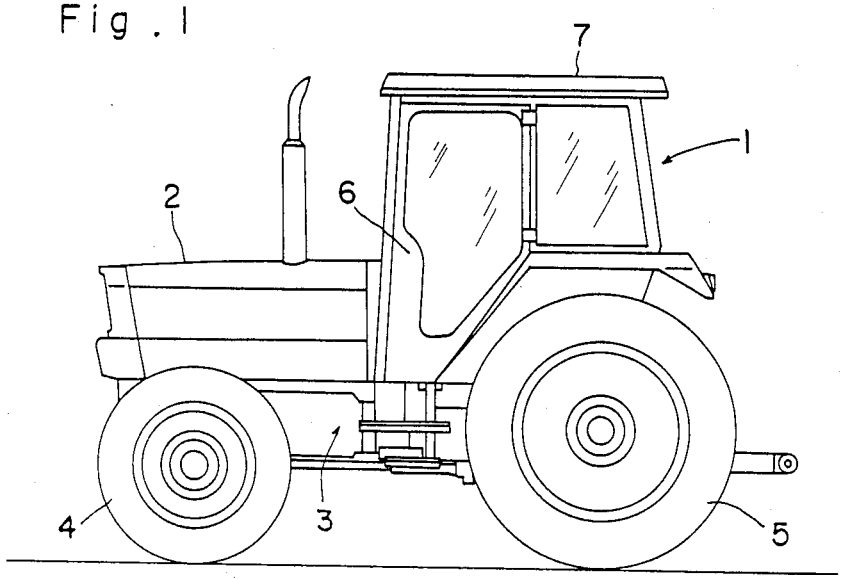
FIG. 1 is a side view of a tractor having a cabin according to the present invention.

Referring to FIG. 1, a tractor shown therein comprises a cabin 1 embodying the present invention. The cabin 1 is mounted on a rear portion of a chassis 3. The tractor also comprises a bonnet 2 enclosing an engine, front wheels 4 and rear wheels 5.

Figure 2:
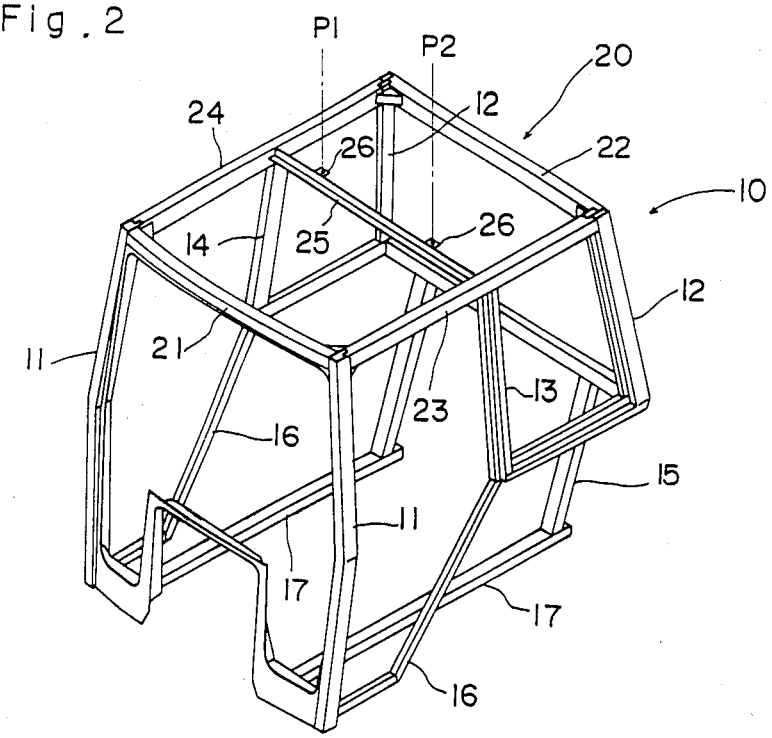
FIG. 2 is a perspective view of a cabin assembly.
Figure 3:
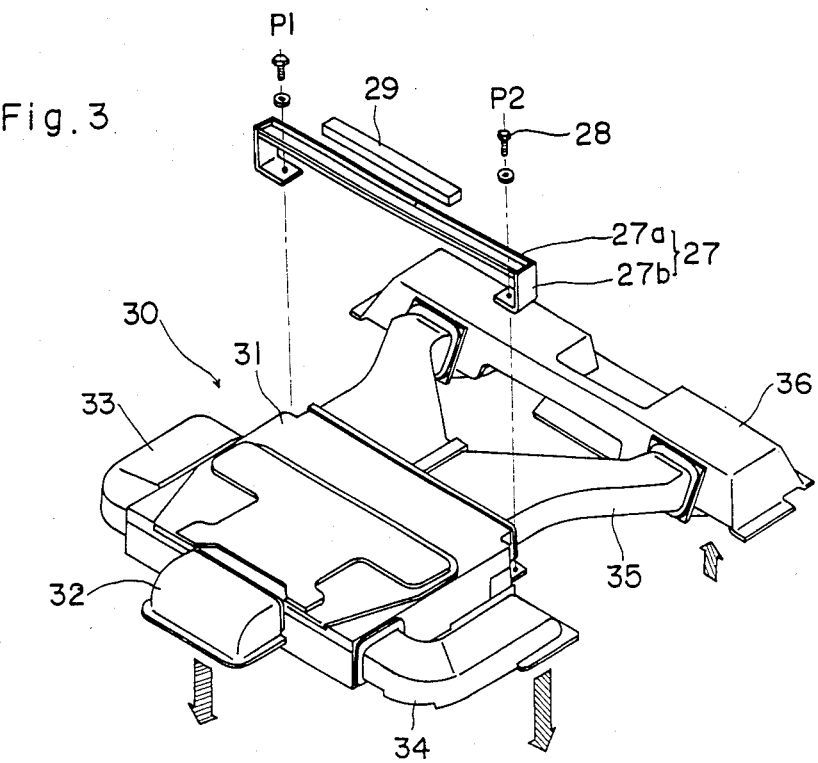
FIG. 3 is a perspective view of an air conditioner assembly and an elastic support member for supporting a top covering.

The cabin 1 has a framework defined by a main framework assembly 10 shown in FIG. 2. The main framework assembly 10 includes right and left front struts 11, right and left rear struts 12, right and left intermediate struts 13 and 14, right and left auxiliary rear struts 15, right and left auxiliary intermediate struts 16, and bottom frames 17. The main framework assembly 10 is fixed through the bottom frames 17 to cushioned mounting brackets secured to the chassis 3. Furthermore, the main framework assembly 10 is reinforced by plates and cross beams extending from one strut to another. Doors 6 are provided between the front struts 11 and the intermediate struts 13 and 14 for the driver to walk into and out of the cabin. A top framework 20 having a substantially rectangular shape in plan view and comprising a front frame 21, a rear frame 22 and side frames 23 and 24 is connected at the four corners thereof to tops of the right and left front struts 11 and the right and left rear struts 12. The top framework 20 further comprises a cross member 25 which, together with other parts of the top framework 20, supports an air conditioner assembly 30 as shown in FIG. 3. The air conditioner assembly 30 is covered by a top covering 7 secured at peripheral undersurfaces thereof directly or through brackets to the top framework 20 by bolts or other means.

Number 27 is FIG. 3 denotes a support member for supporting a central portion of the top covering 7. The support member 27 comprises a length of channel steel 27a and attaching legs 27b welded to opposite ends thereof. This support member 27 is secured to mounting brackets 26 defined on the cross member 25 by means of bolts 28. P1 and P2 denote axes of the bolts 28. As seen from FIG. 3, the support member 27 straddles the air conditioner assembly 30 mounted on the top framework 20. The support member 27 includes an elastic support element 29 formed of rubber, plastics or other elastic material and fitted in the channel steel 27a. The elastic support element 29, which preferably is compressed, has an upper face in contact with an underface of the top covering 7 to support the top covering 7 from below, allowing an elastic deformation but not a plastic deformation of the top covering 7 under a load acting thereon from above. Depending on the construction and size of the air conditioner assembly 30, the elastic support element 29 may be mounted directly on an upper face of the air conditioner assembly 30 thereby dispensing with the support member 27.

The air conditioner assembly 30 comprises an air conditioner 31 having heating, cooling and defrosting functions, a front duct 32 for transmitting defrosting air, a right duct 33 and a left duct 34 for transmitting air conditioned comforting air flows, namely a suitable mixture of hot air and cold air, and a rear duct 35 for taking in air. The rear duct 35 has a blower unit 36 connected thereto to substantiate air intake for the air conditioner 31.

Figure 5:
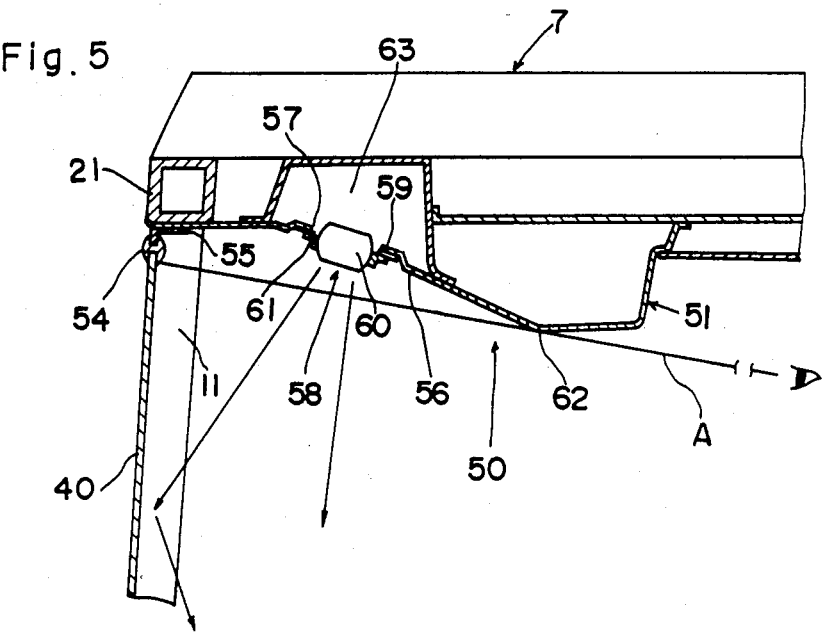
FIG. 5 is an enlarged sectional view of an upper front portion of the cabin interior.
Figure 4:
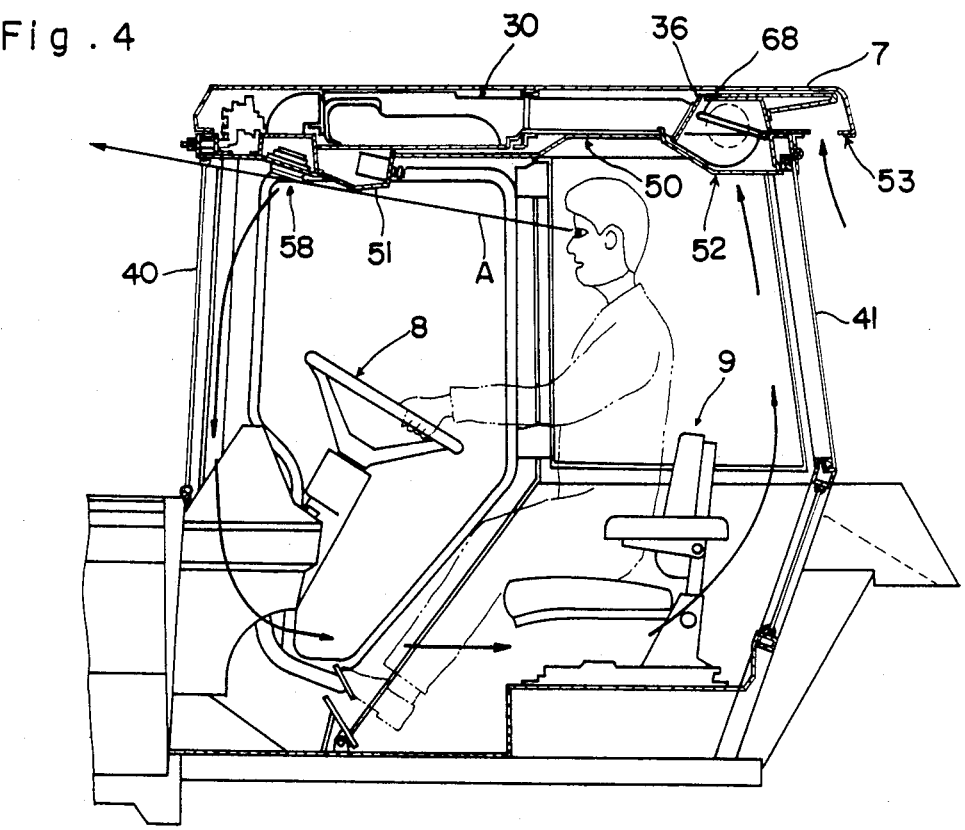
FIG. 4 is a side view of a cabin interior.

As shown in FIG. 4, the cabin interior includes a control section 8 in a front portion and a driver's seat 9 in a rear portion thereof. Its ceiling area is entirely covered by a ceiling assembly 50 comprising a plastic material or the like. The ceiling assembly 50 may be coated with a heat insulating material as desired. Number 40 denotes a windshield which, as better shown in FIG. 5, has an element 54 formed of rubber fitted on peripheries thereof. A mounting member 55 fitted in the element 54 is secured to the front struts 11 and the side frame 21 of the top framework 20. The windshield is slightly inclined rearwardly.

An overhead console box 51 is provided in a front region of the ceiling assembly 50. An inclined portion 56 constituting a back plate of the overhead console box 51 defines right and left openings, and front outlet vent means 58 is removably secured in these openings by bolts.

The front outlet vent means 58 comprises a mounting plate 59 bolted to the inclined portion 56, an outlet vent 60 having a spherical peripheral surface, and a retainer 61 fixed to the mounting plate 59 to rotatably support the outlet vent 60.

The front outlet vent means 58 has a chamber 63 in the back thereof to which the front duct is connected. The front outlet vent means 58 is adapted to receive hot air or cold air from the air conditioner 31 and direct it against the windshield 40 through the outlet vent 60. The outlet vent 60 is rotatable relative to the retainer 61 to change directions of the air flows therefrom, thereby to vary positions of the windscreen 40 to which the air flows are directed.

Since the front outlet vent means 58 comprises the inclined portion 56 which rises forwardly, the air flows delivered from the outlet vent 60 may be selectively directed against a wide area of the windshield. The overhead console box 51 has a lower end 62 thereof located on or above a straight line A extending from the eyes of the driver seated on the seat 9 to a lower edge of an upper portion of the element 54 mounted peripherally of the windshield 40. Therefore, the overhead console box 51 does not reduce the driver's upper forward field of view, whereby the driver has a good view of a front loader operation.

Figure 6:
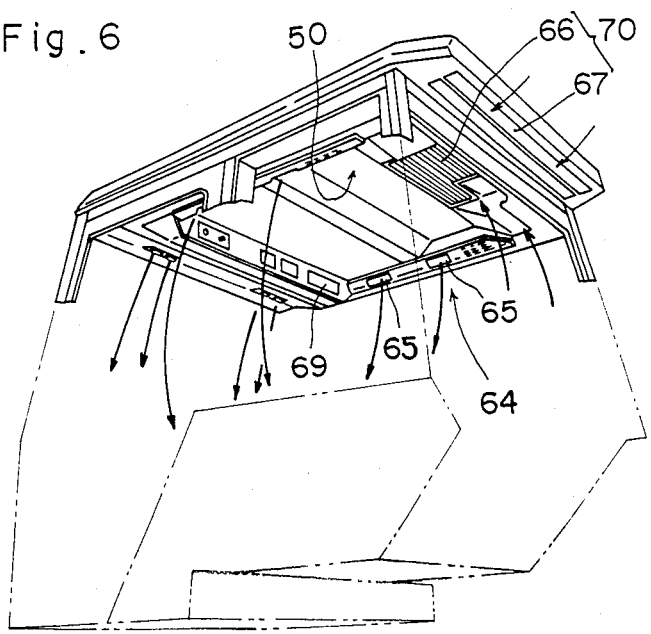
FIG. 6 is a perspective view showing a ceiling assembly and air conditioned flows.

Referring to FIG. 6, right and left lateral sides of the ceiling assembly 50 also include known side outlet vent means 64. The side outlet vent means 64 each comprise two fore and aft outlet vents 65 for directing a mixture of hot air and cold air sideways toward the driver seated on the seat 9. The side outlet vent means 64 also have elongate chambers in the back thereof to which the right and left side ducts 33 and 34 are connected, respectively, to transmit air conditioned flows from the air conditioner 31 to the outlet vents 65.

The ceiling assembly 50 further includes an inside air intake vent 66 at a rear portion thereof to take in air from the cabin interior.

The cabin has a rear glass 41 inclined forwardly toward the intake vent 66.

The ceiling assembly 50 has a rear end defining an overhanging projection 53 which includes an outside air intake vent 67 in an under face thereof. The inside air intake vent 66 and the outside air intake vent 67 constitute air intake vent means 70 connected to the blower unit 36. The blower unit 36 includes a damper 68 (FIG. 4) switchable between a position to connect the inside air intake vent 66 and a position to connect the outside air intake vent 67 to the air conditioner 31 through the rear duct 35.

Each of the side outlet vents 65 is provided with adjusting means for the driver to adjust the direction and amount of air flowing therefrom. Further, the side outlet vent means 64 includes dampers or the like for selectively supplying air to the side outlet vents 65. The overhead console box 51 includes, along with a radio and other devices, an air conditioning control unit 69 for effecting various adjustments of the dampers of the side outlet vent means 64, the damper 68 of the blower unit 36, the adjusting means of the side outlet vents 65, and the air conditioner 31.

FIG. 6 shows, by means of arrows, the defrosting air flows delivered from the front portion of the ceiling assembly 50, the conforting air flows delivered from the lateral sides both in front of and at the back of the seated driver, and the air flows withdrawn from the rear portion of the cabin interior. It will be understood that the invention provides an excellent environment of air conditioned flows in the cabin interior.

What is claimed is:

1. An air conditioner assembly for a tractor cabin including
   a main framework assembly (10) including struts (11-16) and a top framework (20),
   a top covering (7) mounted on the top framework (20),
   a windshield (40) attached to the main framework assembly (10) through a mounting element (54) provided peripherally of the windshield,
   said air conditioner assembly (30) mounted between the top framework (20) and the top covering (7), with a ceiling assembly (50) covering the air conditioner assembly (30), said air conditioner including a front, side and rear,
   front outlet vent means (58) for supplying hot defrosting air, side outlet vent means (64) for supplying a mixture of hot and cold air, and intake vent means (70) directed downwardly in the rear,
   said front outlet vent means (58) being disposed in a front region of the ceiling assembly and adapted to direct air flow against the windshield, said side outlet vent means (64) being disposed in intermediate lateral regions of the ceiling assembly to direct air flow toward and to the sides of the driver, and said intake vent means (70) including an inside air intake vent (66) disposed in a rear region of the ceiling assembly (50) of the cabin interior and an outside air intake vent (67) disposed in a projection (53) overhanging rearwardly from the ceiling assembly (50), a rear glass (41) inclined forwardly to meet an opening area of the intake vent means (70) with at least a ninety degree angle formed between said intake vent and said rear glass, and an overhead console box (51) disposed in the ceiling assembly (50) rearwardly of the front outlet vent means (58) and projecting to a greater extent into the cabin than the front outlet vent means, said console box (51) having a lower end (62) thereof located substantially on a straight line (A) extending from eye level with the driver to a lower edge of an upper portion of the mounting element (54).

2. An air conditioner assembly for a tractor cabin as claimed in claim 1 wherein the air conditioner assembly (30) includes an air conditioner (31), a front duct (32) in communication with the front outlet vent means (58), side ducts (33, 34) in communication with the side outlet vent means (64), a rear intake duct (35), and a blower unit (36) mounted between the rear intake duct (35) and the intake vent means (70).

3. An air conditioner assembly for a tractor cabin as claimed in claim 2 wherein the blower unit (35) includes a damper (68) for adjusting a ratio of air intake between the inside air intake vent (66) and the outside air intake vent (67) for delivery to the air conditioner (31).

4. An air conditioner assembly for a tractor cabin as claimed in claim 3 wherein the top covering (7) has a flat configuration and supported from below by a support member (27) mounted on a cross beam (25) attached to the top framework (20) through an elastic support element (29) mounted on an upper surface of the support member (27).

5. An air conditioner assembly for a tractor cabin as claimed in claim 4 wherein the overhead console box (51) includes an air conditioning control unit (69).

* * * * *